US012651027B2

(12) United States Patent
Londeree

(10) Patent No.: US 12,651,027 B2
(45) Date of Patent: Jun. 9, 2026

(54) MULTI-DOMAIN QUESTION ANSWERING SYSTEM PROVIDING DOCUMENT LEVEL INFERENCE AND RELATED METHODS AND COMPUTER PROGRAM PRODUCTS

(71) Applicant: Change Healthcare Holdings LLC, Nashville, TN (US)

(72) Inventor: Alex Londeree, Austin, TX (US)

(73) Assignee: Change Healthcare Holdings LLC, Nashville, TN (US)

( * ) Notice: Subject to any disclaimer, the term of this patent is extended or adjusted under 35 U.S.C. 154(b) by 1124 days.

(21) Appl. No.: 17/514,561

(22) Filed: Oct. 29, 2021

(65) Prior Publication Data

US 2023/0134791 A1    May 4, 2023

(51) Int. Cl.
| | |
|---|---|
| *G06F 16/93* | (2019.01) |
| *G06N 3/044* | (2023.01) |
| *G06N 3/045* | (2023.01) |

(52) U.S. Cl.
CPC ............. *G06F 16/93* (2019.01); *G06N 3/044* (2023.01); *G06N 3/045* (2023.01)

(58) Field of Classification Search
CPC ......... G06F 16/93; G06N 3/044; G06N 3/045
See application file for complete search history.

(56) References Cited

U.S. PATENT DOCUMENTS

| | | | | |
|---|---|---|---|---|
| 2013/0218596 A1* | 8/2013 | Gome | .................... | G16H 50/20 |
| | | | | 705/2 |
| 2021/0216576 A1* | 7/2021 | Staub | ................. | G06Q 30/0282 |
| 2021/0216577 A1* | 7/2021 | Xiao | ................... | G06F 16/3329 |
| 2021/0240776 A1* | 8/2021 | Jawagal | ................. | G06N 3/049 |

(Continued)

OTHER PUBLICATIONS

Wang et al., "DSDR: Dynamic Semantic Discard Reader for Open-Domain Question Answering," 2018 International Conference on Neural Networks (IJCNN), 7, pgs. (Year: 2018).*

(Continued)

*Primary Examiner* — Eric J. Bycer
(74) *Attorney, Agent, or Firm* — MARSHALL, GERSTEIN & BORUN LLP

(57) ABSTRACT

A method includes discarding a current knowledge corpus; selecting a new knowledge corpus; performing operations as follows using an Artificial Intelligence (AI) retriever engine: dividing the new knowledge corpus into a plurality of sub-documents; encoding a query for the plurality of sub-documents using a query encoding model; encoding each of the plurality of sub-documents using a document encoding model; and determining at least one matching sub-document of the plurality of sub-documents that is a match for containing an answer to the query based on the encoded query and each of the plurality of encoded sub-documents; performing operations as follows using an AI reader engine: generating an inference about the answer to the query based on a concatenation of each of the at least one matching sub-document with the query, each of the at least one matching sub-document having an associated reader loss function result for the inference; identifying one of the at least one matching sub-document having a lowest reader loss function result; and associating the identified one of the at least one matching sub-document with a truth label for the query.

20 Claims, 7 Drawing Sheets

(56) References Cited

U.S. PATENT DOCUMENTS

| | | | | |
|---|---|---|---|---|
| 2021/0312132 A1* | 10/2021 | Wang | ............... | G06F 18/22 |
| 2021/0374141 A1* | 12/2021 | Zhao | ............ | G06F 16/24578 |
| 2022/0335219 A1* | 10/2022 | Sengupta | ........... | G06N 3/042 |

OTHER PUBLICATIONS

Zhang et al., "Factoid Question Answering with Distant Supervision," Entropy 2018, 20, 439, 22 pgs. (Year: 2018).*

Zheng et al., "Novel knowledge-based system with relation detection and textual evidence for question answering research," PLOS 1, Oct. 3, 2018, 21 pgs. (Year: 2018).*

Uttarwar et al., "Machine learning based review on Development and Classification of Question-Answering Systems," Proceedings of the Third International Conference on Computing Methodologies and Communications (ICCMC 2019), pp. 359-366. (Year: 2019 ).*

Arbaaeen et al., "Natural Language Processing based Question Answering Techniques: A Survey," 2020 IEEE 7th International Conference on Engineering Technologies and Applied Sciences (ICETAS), 8 pgs. (Year: 2020).*

Izacard et al., "Distilling Knowledge from Reader to Retriever for Question Answering," Dec. 8, 2020, 13 pgs. (Year: 2020).*

Gao et al., "Complement Lexical Retrieval Model with Semantic Residual Embeddings," Mar. 29, 2021, 15 pgs. (Year: 2021).*

Jul. 2024 Subject Matter Eligibility Examples (47-49). (Year: 2025).*

Guu, Kelvin , et al., "REALM: Retrieval-Augmented Language Model Pre-Training", Retrieved from arXiv API at https://arxiv.org/abs/2002.08909, 2020, 12 pages.

Horev, Rani , "BERT Explained: State of the art language model for NLP", Towards Data Science, retrieved from: https://towardsdatascience.com/bert-explained-state-of-the-art-language-model-for-nlp-f8b21a9b6270, 2018, 7 pages.

Roberts, Adam , "Exploring Transfer Learning with T5: the Text-To-Text Transfer Transformer", Google AI Blog, retrieved from: https://ai.googleblog.com/2020/02/exploring-transfer-learning-with-t5.html, 2020, 5 pages.

Weng, Lilian , "How to Build an Open-Domain Question Answering System?", Lil'Log, retrieved from: https://lilianweng.github.io/lil-log/2020/10/29/open-domain-question-answering.html, 2020.

* cited by examiner

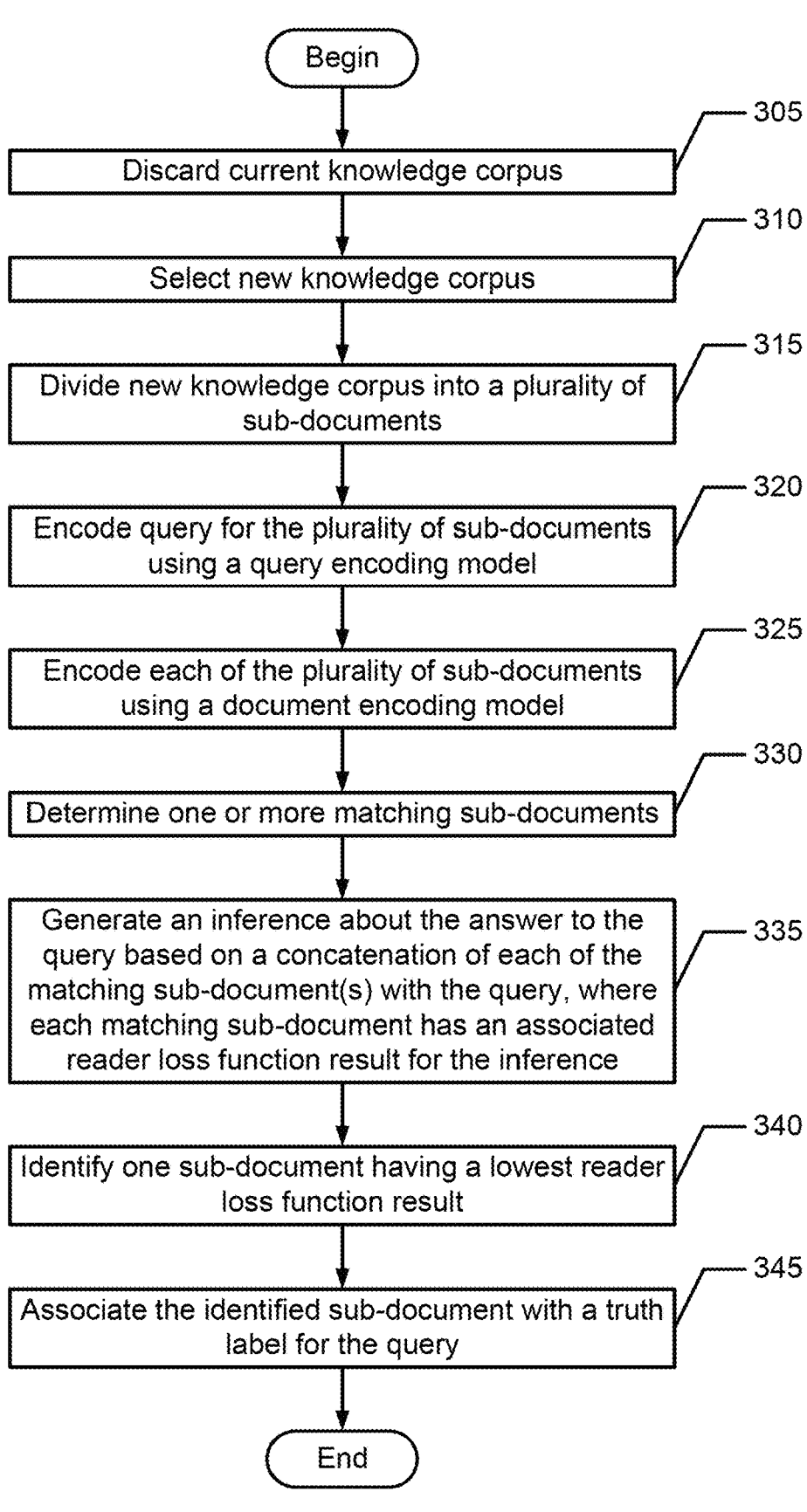

Begin

Discard current knowledge corpus — 305

Select new knowledge corpus — 310

Divide new knowledge corpus into a plurality of sub-documents — 315

Encode query for the plurality of sub-documents using a query encoding model — 320

Encode each of the plurality of sub-documents using a document encoding model — 325

Determine one or more matching sub-documents — 330

Generate an inference about the answer to the query based on a concatenation of each of the matching sub-document(s) with the query, where each matching sub-document has an associated reader loss function result for the inference — 335

Identify one sub-document having a lowest reader loss function result — 340

Associate the identified sub-document with a truth label for the query — 345

End

MULTI-DOMAIN QUESTION ANSWERING SYSTEM PROVIDING DOCUMENT LEVEL INFERENCE AND RELATED METHODS AND COMPUTER PROGRAM PRODUCTS

FIELD

The present inventive concepts relate generally to health care systems and services and, more particularly, to a question answering system for use with large knowledge bases, such as medical records.

BACKGROUND

Question Answering (QA) is a discipline within the fields of information retrieval and Natural Language Processing (NLP), which is concerned with building systems that automatically answer questions posed by humans in a natural language. Closed-domain QA typically handles questions related to a specific domain or topic and can exploit domain-specific knowledge frequently formalized in ontologies. Closed-domain QA may also refer to situations where only certain types of questions are allowed. Open-domain QA deals with questions about a variety of topics or subjects and typically relies on general ontologies and knowledge. Open-domain QA systems, however, typically have a large amount of data available from which to generate an answer. The knowledge base or corpus used in health care or medical field QA systems may be very large. Medical documents, such as patient records, can be very large making training an Artificial Intelligence (AI) system difficult. In addition, many of the potential labels that may be used in medical documents, patient records, and the like, such as medical codes, are assigned at the document/encounter level. There is often little indication about where the information that led to the label might be located. Without knowing where in a document the information that resulted in a label might be, it may be difficult to train an AI system. Further, the directions or expert knowledge used to complete a task might change over time, such as coding guidelines. As a result, any rules trained into an AI model may become outdated.

SUMMARY

According to some embodiments of the inventive concept, a method comprises: discarding a current knowledge corpus: selecting a new knowledge corpus: performing operations as follows using an Artificial Intelligence (AI) retriever engine: dividing the new knowledge corpus into a plurality of sub-documents: encoding a query for the plurality of sub-documents using a query encoding model: encoding each of the plurality of sub-documents using a document encoding model; and determining at least one matching sub-document of the plurality of sub-documents that is a match for containing an answer to the query based on the encoded query and each of the plurality of encoded sub-documents: performing operations as follows using an AI reader engine: generating an inference about the answer to the query based on a concatenation of each of the at least one matching sub-document with the query, each of the at least one matching sub-document having an associated reader loss function result for the inference: identifying one of the at least one matching sub-document having a lowest reader loss function result; and associating the identified one of the at least one matching sub-document with a truth label for the query.

In other embodiments, the method further comprises: updating the AI reader engine based on the at least one reader loss function result associated with the at least one matching sub-document, respectively: updating the query encoding model based on at least one match loss function result between the query and the at least one matching sub-document, respectively; and updating the document encoding model based on the at least one match loss function result between the query and the at least one matching sub-document, respectively.

In still other embodiments, each of the query encoding model and the document encoding model comprise a vector space model.

In still other embodiments, the vector space model uses a term frequency-inverse document frequency weighting scheme.

In still other embodiments, each of the query encoding model and the document encoding model comprise a neural information retrieval model.

In still other embodiments, the reader engine comprises a Long Short-Term Memory (LSTM) artificial recurrent neural network.

In still other embodiments, the reader engine comprises a Bidirectional Encoder Representations from Transformers (BERT) machine learning system.

In still other embodiments, the new knowledge corpus comprises one or more medical records.

In still other embodiments, the query comprises a question about one or more medical records.

In some embodiments of the inventive concept, a method comprises: discarding a current knowledge corpus: selecting a new knowledge corpus: performing operations as follows using an Artificial Intelligence (AI) retriever engine: dividing the new knowledge corpus into a plurality of sub-documents: encoding a query for the plurality of sub-documents using a query encoding model: encoding each of the plurality of sub-documents using a document encoding model; and determining one matching sub-document of the plurality of sub-documents that is a best match for containing an answer to the query based on the encoded query and each of the plurality of encoded sub-documents: performing operations as follows using an AI reader engine: generating an inference about the answer to the query based on a concatenation of the one matching sub-document with the query.

In further embodiments, the method further comprises: providing a supplemental knowledge corpus.

In still further embodiments, the method further comprises: querying the supplemental knowledge corpus to generate a preliminary query result; and modifying the query for the plurality of sub-documents based on the preliminary query result.

In still further embodiments, modifying the query for the plurality of sub-documents comprises concatenating the query with the preliminary query result.

In still further embodiments, each of the query encoding model and the document encoding model comprise a vector space model: or each of the query encoding model and the document encoding model comprise a neural information retrieval model.

In still further embodiments, the reader engine comprises a Long Short-Term Memory (LSTM) artificial recurrent neural network.

In still further embodiments, the reader engine comprises a Bidirectional Encoder Representations from Transformers (BERT) machine learning system.

In still further embodiments, the new knowledge corpus comprises one or more medical records.

In still further embodiments, the query comprises a question about one or more medical records.

In some embodiments, a system comprises: a processor; and a memory coupled to the processor and comprising computer readable program code embodied in the memory that is executable by the processor to perform operations comprising: discarding a current knowledge corpus: selecting a new knowledge corpus: performing operations as follows using an Artificial Intelligence (AI) retriever engine: dividing the new knowledge corpus into a plurality of sub-documents: encoding a query for the plurality of sub-documents using a query encoding model: encoding each of the plurality of sub-documents using a document encoding model; and determining at least one matching sub-document of the plurality of sub-documents that is a match for containing an answer to the query based on the encoded query and each of the plurality of encoded sub-documents: performing operations as follows using an AI reader engine: generating an inference about the answer to the query based on a concatenation of each of the at least one matching sub-document with the query, each of the at least one matching sub-document having an associated reader loss function result for the inference: identifying one of the at least one matching sub-document having a lowest reader loss function result; and associating the identified one of the at least one matching sub-document with a truth label for the query.

In some embodiments of the inventive concept, a computer program product comprises: a non-transitory computer readable storage medium comprising computer readable program code embodied in the medium that is executable by a processor to perform operations comprising: discarding a current knowledge corpus: selecting a new knowledge corpus: performing operations as follows using an Artificial Intelligence (AI) retriever engine: dividing the new knowledge corpus into a plurality of sub-documents: encoding a query for the plurality of sub-documents using a query encoding model: encoding each of the plurality of sub-documents using a document encoding model; and determining at least one matching sub-document of the plurality of sub-documents that is a match for containing an answer to the query based on the encoded query and each of the plurality of encoded sub-documents: performing operations as follows using an AI reader engine: generating an inference about the answer to the query based on a concatenation of each of the at least one matching sub-document with the query, each of the at least one matching sub-document having an associated reader loss function result for the inference: identifying one of the at least one matching sub-document having a lowest reader loss function result; and associating the identified one of the at least one matching sub-document with a truth label for the query.

Other methods, systems, articles of manufacture, and/or computer program products according to embodiments of the inventive concept will be or become apparent to one with skill in the art upon review of the following drawings and detailed description. It is intended that all such additional systems, methods, articles of manufacture, and/or computer program products be included within this description, be within the scope of the present inventive subject matter and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which:

FIGS. 3-5 are flowcharts that illustrate training operations and inference operations of the QA system in accordance with some embodiments of the inventive concept:

DETAILED DESCRIPTION

Figure 1:
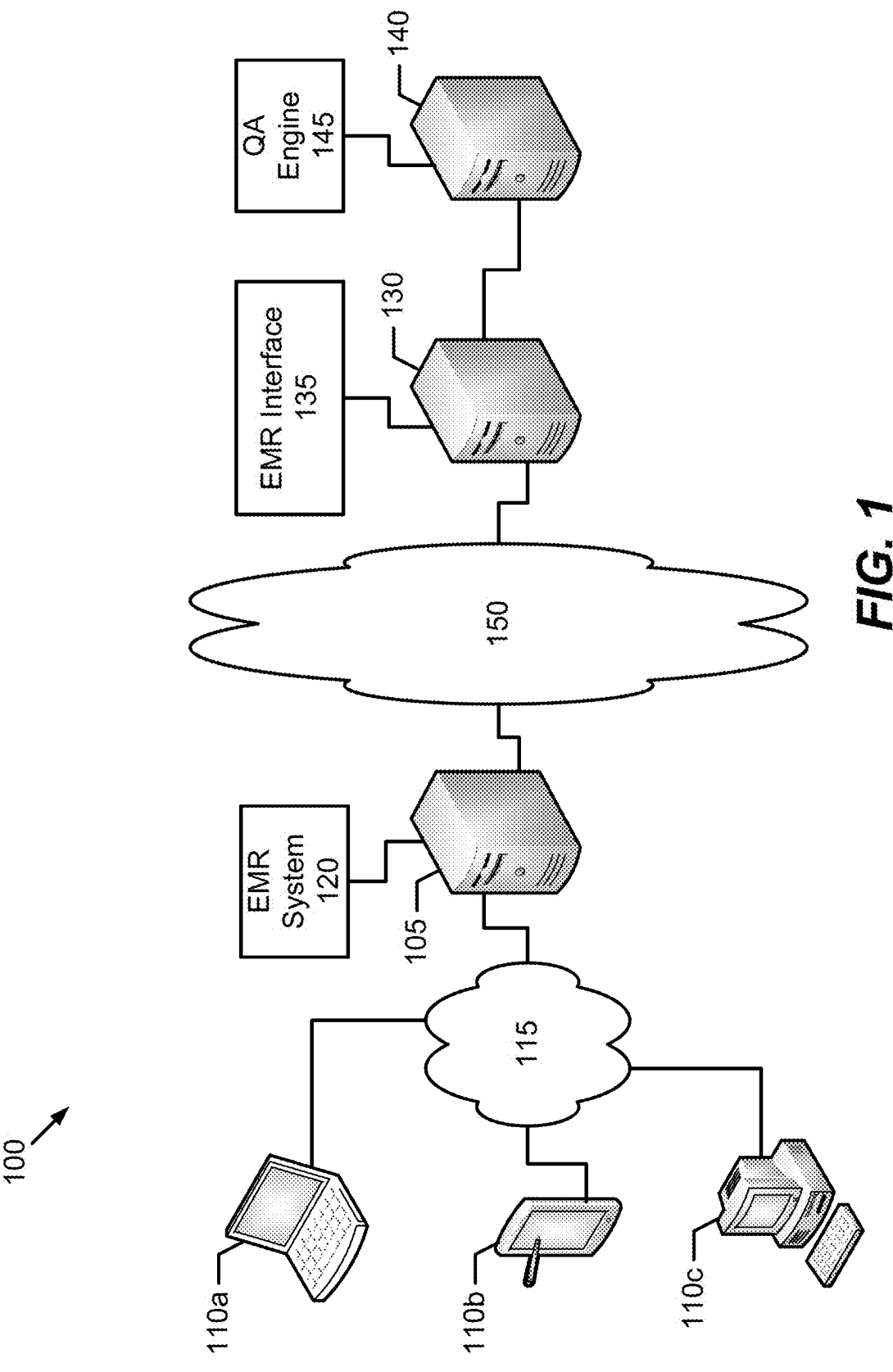
FIG. 1 is a block diagram that illustrates a communication network including a Question Answering (QA) system configured to provide document level inference in accordance with some embodiments of the inventive concept.

In the following detailed description, numerous specific details are set forth to provide a thorough understanding of embodiments of the inventive concept. However, it will be understood by those skilled in the art that embodiments of the inventive concept may be practiced without these specific details. In some instances, well-known methods, procedures, components, and circuits have not been described in detail so as not to obscure the inventive concept. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "provider" may mean any person or entity involved in providing health care products and/or services to a patient.

Embodiments of the inventive concept are described herein in the context of a Question Answering (QA) system configured to provide document level inference that includes an artificial intelligence (AI) engine, which uses natural language processing and language modeling. It will be understood that embodiments of the inventive concept are not limited to a machine learning implementation of the QA system and other types of AI systems may be used including, but not limited to, a multi-layer neural network, a machine learning system, a deep learning system, and/or computer vision system. Moreover, it will be understood that the multi-layer neural network is a multi-layer artificial neural network comprising artificial neurons or nodes and does not include a biological neural network comprising real biological neurons.

Embodiments of the inventive concept are described herein in the context of a QA system applied to the health care and/or medical field. It will be understood, however, that embodiments of the present inventive concept can be applied to other fields. Embodiments of the inventive concept may be particularly applicable for use in open-domain QA systems that use a large knowledge base or corpus and/or systems in which it is helpful or required to keep information in the knowledge base or corpus divided or segregated due to rules against combining or mixing certain information.

Some embodiments of the inventive concept stem from a realization that QA systems used in the field of health care or medicine, for example, may be difficult to implement for at least two reasons: 1) the knowledge base or corpus used in the health care or medical field may be very large making training of the underlying AI system powering the QA system difficult; and 2) the knowledge base or corpus used in the health care or medical field may be populated with patient records, which are considered Protected Health Information (PHI) and are protected by privacy laws. As a result, a QA system may not mix information from different patient records for use in generating an inference in response to a query. Some embodiments of the inventive concept differ from conventional QA systems that are trained using a single large knowledge base or corpus dataset to make inferences in that each training iteration and each inference replaces the previous knowledge base or corpus with a unique document. This may prevent the co-mingling of patient medical records, for example, and reduce the risk of a PHI violation. Moreover, the QA system according to embodiments of the inventive concept may use a retriever engine-reader engine architecture in which the retriever engine discards a current knowledge base or corpus, selects a new knowledge base or corpus, which is divided into multiple sub-documents. During training mode, both a query and the sub-documents may be encoded and one or more matching sub-documents may be determined based on the encoded query and sub-documents using the retriever engine. The matching sub-documents are each concatenated with the query and communicated to the reader engine, which generates an inference about the answer to the query based on each of these sub-documents that are concatenated with the query. A reader loss function is applied to identify the matching sub-document having the lowest reader loss function result. The identified matching sub-document may then be associated with a truth label for the query and the AI reader engine may be updated based on the reader loss function results associated with the matching sub-documents. Similarly, the query encoding model and the document encoding model may be updated using a match loss function result between the query and the matching sub-documents. By dividing the knowledge base or corpus into sub-documents using the retriever engine, the reader engine may be trained and then used to make inferences without needing access to the entire knowledge base or corpus, which can be very large.

During inference mode, the current knowledge base or corpus is discarded, a new knowledge base or corpus is selected, and the new knowledge base or corpus is divided into multiple sub-documents using the retriever engine. A query is received and the retriever engine encodes both the query and the sub-documents. The retriever engine determines a sub-document that is a best match for containing the answer to the query using, for example, a match loss function. The query and the matching sub-document are concatenated and communicated to the reader engine, which generates an inference about the answer to the query based on the concatenated matching sub-document and query.

In some embodiments, the retriever engine may make use of a supplemental knowledge base or corpus for which there is no risk, for example, in mixing information between the new knowledge base or corpus and the supplemental knowledge base or corpus. For example, a supplemental knowledge base or corpus may contain coding guidelines, which pose no risk of a PHI violation in combining the coding guideline information with patient medical record information. The retriever engine may query the supplemental knowledge base or corpus to generate a preliminary query result. The query for the new knowledge base or corpus may be modified through concatenation with the preliminary query result. Thus, the preliminary query result may be communicated to the reader engine when the query is concatenated with the matching sub-document for use in generating an inference for the query.

Thus, the QA system according to embodiments of the inventive concept may reduce the amount of information provided to a reader engine in making an inference in response to a query by using a retriever engine to divide a larger knowledge base or corpus into sub-documents and identifying the sub-document most likely to contain information for generating an inference in response to the query. The identified sub-document along with the query may be communicated to the reader engine to generate the inference. The division of the knowledge base or corpus into sub-documents for use by the QA system in training and in generating an inference reduces the problems of trying to train using an unwieldly amount of information as can be common with health care and/or medical knowledge bases. Moreover, the previous knowledge base or corpus used in a prior training or inference iteration is discarded before beginning a new training or inference iteration thereby reducing the risk of mixing information that should not be co-mingled. Embodiments of the QA system may be used in a variety of applications including, but not limited to, medical coding, data entry, and health care insurance claim auditing. For example, a payor may use embodiments of the QA system as part of a navigation tool to query medical records for the date of service of a particular procedure as part of a data entry operation. Health care providers may use embodiments of the QA system to query medical records and/or clinical statements to identify details of procedures performed as part of a medical coding task. Payors may also use embodiments of the QA to query claims as part of an auditing task to check for inconsistencies, improper payments, and the like.

Referring to FIG. 1, a communication network 100 including a QA system providing document level inference, in accordance with some embodiments of the inventive concept, comprises a health care facility server 105 that is coupled to devices 110a, 110b, and 110c via a network 115. The health care facility may be any type of health care or medical facility, such as a hospital, doctor's office, specialty center (e.g., surgical center, orthopedic center, laboratory center etc.), or the like. The health care facility server 105 may be configured with an Electronic Medical Record (EMR) system module 120 to manage patient files and facilitate the entry of orders for patients via health care service providers ("providers"). Although shown as one combined system in FIG. 1, it will be understood that some health care facilities use separate systems for electronic medical record management and order entry management. The providers may use devices, such as devices 110a, 110b, and 110c to manage patients' electronic charts or records and to issue orders for the patients through the EMR system 120. An order may include, but is not limited to, a treatment, a procedure (e.g., surgical procedure, physical therapy procedure, radiologic/imaging procedure, etc.) a test, a prescription, and the like. The network 115 communicatively couples the devices 110a, 110b, and 110c to the health care facility server 105. The network 115 may comprise one or more local or wireless networks to communicate with the health care facility server 105 when the health care facility server 105 is located in or proximate to the health care facility. When the health care facility server 105 is in a remote location from the health care facility, such as part of a cloud computing system or at a central computing center, then the network 115 may include one or more wide area or global networks, such as the Internet.

According to some embodiments of the inventive concept, a QA system may be provided to assist entities, such as providers, payors, researchers, and others to perform queries using patient health care records as a knowledge base or corpus. The QA system may include a health care facility interface server 130, which includes an EMR interface system module 135 to facilitate the transfer of information between the EMR system 120, which the providers use to manage patient charts and records and issue orders, and a QA system server 140, which includes a QA engine module 145. The QA system server 140 and QA engine module 145 may be configured to receive patient records and/or other health care or medical information by way of the health care facility interface server 130 and EMR interface module 135. The QA system server 140 along with the QA engine module 145 may be configured to embody an AI driven retriever engine and reader engine for generating inferences in response to one or more queries using a knowledge base or corpus that may be based on the patient records and/or other health care or medical information.

It will be understood that the division of functionality described herein between the QA system server 140/QA engine module 145 and the health care facility interface server 130/EMR interface module 135 is an example. Various functionality and capabilities can be moved between the QA system server 140/QA engine module 145 and the health care facility interface server 130/EMR interface module 135 in accordance with different embodiments of the inventive concept. Moreover, in some embodiments, the QA system server 140/AI engine module 145 and the health care facility interface server 130/EMR interface module 135 may be merged as a single logical and/or physical entity.

A network 150 couples the health care facility server 105 to the health care facility interface server 130. The network 150 may be a global network, such as the Internet or other publicly accessible network. Various elements of the network 150 may be interconnected by a wide area network, a local area network, an Intranet, and/or other private network, which may not be accessible by the general public. Thus, the communication network 150 may represent a combination of public and private networks or a virtual private network (VPN). The network 150 may be a wireless network, a wireline network, or may be a combination of both wireless and wireline networks.

The QA service provided through the health care facility interface server 130, EMR interface module 135, QA system server 140 and QA engine module 145 to provide document level inference may, in some embodiments, be embodied as a cloud service. For example, entities may integrate their clinical record processing system with the QA service and access the service as a Web service. In some embodiments, the QA service may be implemented as a Representational State Transfer Web Service (RESTful Web service).

Although FIG. 1 illustrates an example communication network including a QA system for providing document level inference, it will be understood that embodiments of the inventive concept are not limited to such configurations, but are intended to encompass any configuration capable of carrying out the operations described herein.

Figure 2:
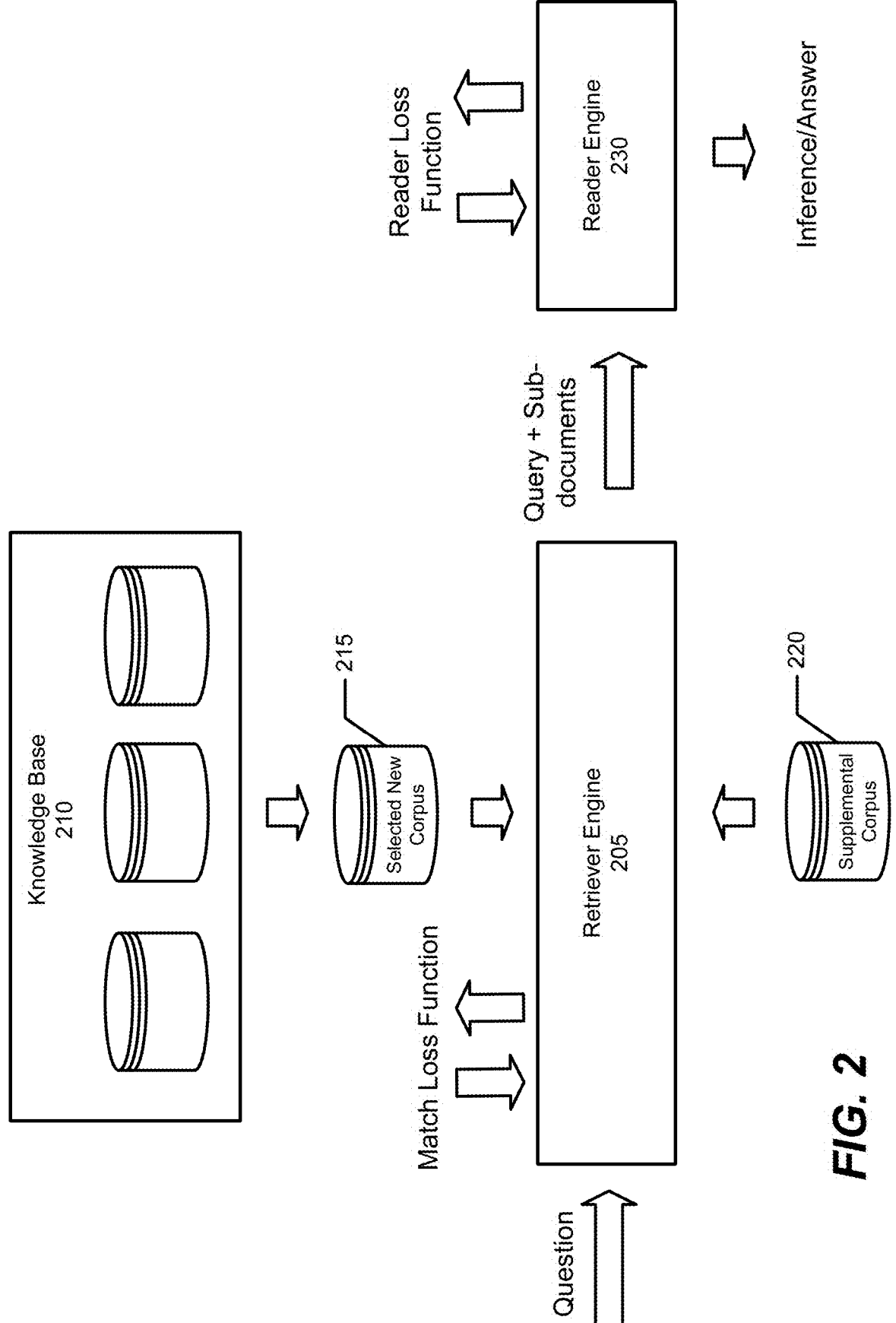
FIG. 2 is a block diagram of the QA system in accordance with some embodiments of the inventive concept.

FIG. 2 is a block diagram of a QA system in accordance with some embodiments of the inventive concept. The QA system of FIG. 2 may be used to implement embodiments of the QA system server 140 and QA engine module 145 of FIG. 1. Referring now to FIG. 2, the QA system includes a retriever engine 205 and a reader engine 230. The retriever engine 205 may be configured to receive a query in the form of a question and may have access to a knowledge base 210 containing information for generating an inference or an answer to the query or question. The knowledge base 210 may be a large document, such as a collection of patient medical records, claims data, and other health care or medical information. Thus, the retriever engine 205 may be configured to divide the document in the knowledge base 210 into a plurality of sub-documents, which may be indexed based on a suitable categorization indicium. For example, for medical records, the sub-documents may be indexed based on patient name. During training, the retriever engine 205 may be configured to discard a current knowledge base or corpus and select a new knowledge base or corpus 215 that may include one or more of the plurality of sub-documents.

The retriever engine 205 is further configured to encode both the query and the sub-documents. In some embodiments, the retriever engine 205 may use a vector space model to encode the query and/or the sub-documents. A vector space model is an algebraic model for representing text documents as vectors of identifiers. Each vector dimension corresponds to a separate term. If a term occurs in the document, its value in the vector is non-zero. There are multiple ways to compute the term values including using a Term Frequency-Inverse Document Frequency (TF-IDF) weighting scheme. TF-IDF is a numerical statistic that is designed to reflect how important a word is to a document in a collection or corpus. In other embodiments, the query encoding model and/or the document encoding model may be encoded as part of a neural information retrieval model. Thus, the retriever engine 205 may be configured to determine one or more matching sub-documents based on, for example, using vector space model encoding of the query and sub-documents or using a shallow or deep neural network to rank search results of the sub-document based on the query. During training, the retriever engine 205 is configured to concatenate the matching sub-documents with the query for communication to the reader engine 230. The reader engine 230 may be embodied in a variety of ways including, for example, as a Long Short-Term Memory (LSTM) artificial recurrent neural network or a Bidirectional Encoder Representations from Transformers (BERT) machine learning system. An LSTM neural network, in contrast to standard feedforward neural networks, has feedback connections. It can process both single data points as well as sequences of data, such as speech, video, or text. BERT is a transformer-based machine learning technique for Natural Language Processing (NLP) pre-training. A transformer is a deep learning model that uses a mechanism called attention, which involves the differential weighing of the significance of each part of the input data. During training, the reader engine 230 may be configured to generate an inference about the answer to the query based on each of the matching sub-documents that are concatenated with the query. A reader loss function may be applied to identify the matching sub-document having the lowest reader loss function result. This identified matching sub-document may then be associated with a truth label for the query and the AI reader engine 230) may be updated based on the reader loss function results associated with the matching sub-documents. Similarly, the retriever engine 205 may be configured to update the query encoding model and the document encoding model using a match loss function that generates a match loss function result based on the query and the matching sub-documents. A loss function may be described generally as a function that computes the distance between the current output of an operation and the expected output. In accordance with various embodiments of the inventive concept, the reader loss function and/or the match loss function may comprise a regression loss function or a classification loss function. Broadly described, classification involves prediction of an output from a set of finite categorical values. Regression involves prediction of a continuous value from other information.

During inference mode, similar to training mode, the retriever engine 205 may be configured to discard the current knowledge base or corpus select a new knowledge base or corpus, which is divided into a plurality of indexed sub-documents. The retriever engine 205 is configured to receive a query or question and encode both the query and the sub-documents. The retriever engine 205 is further configured to determine which of the sub-documents is a best match for containing the answer to the query using a match loss function as described above. The query and the best matching sub-document are concatenated and communicated to the reader engine 230, which is configured to generate an inference about the answer based on the concatenated query and best matching sub-document.

In some embodiments, the retriever engine 205 may be configured to use a supplemental corpus 220 to obtain additional information to improve the accuracy of the inference or answer generated by the reader engine 230. For example, the supplemental corpus 220 may contain information that can be combined with the information in the selected new corpus 215. The retriever engine 205 may be configured to query the supplemental corpus 220 to generate a preliminary query result. The query or question received at the retriever engine 205 for the selected new corpus 215 may be modified through concatenation with the preliminary query result. Thus, the preliminary query result may be communicated to the reader engine 230 when the query is concatenated with the matching sub-document for use in generating an inference for the query, which may result in a more accurate inference or answer.

Figure 4:
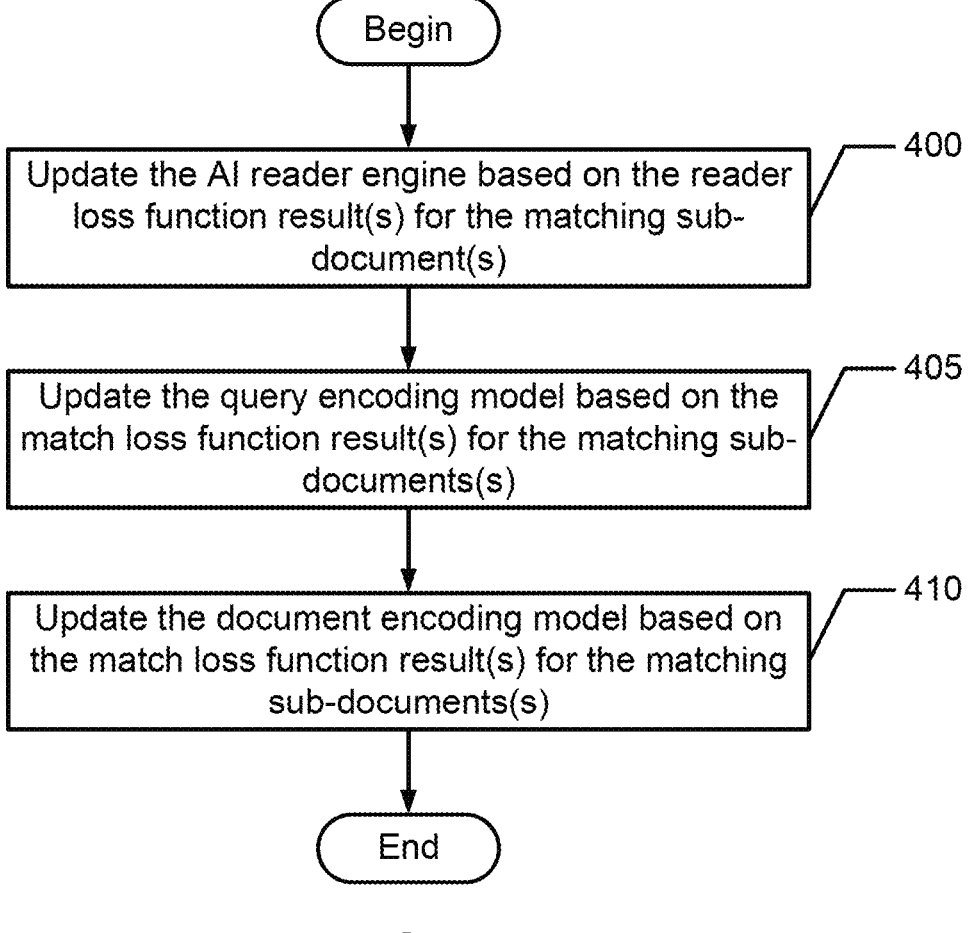
Figure 5:
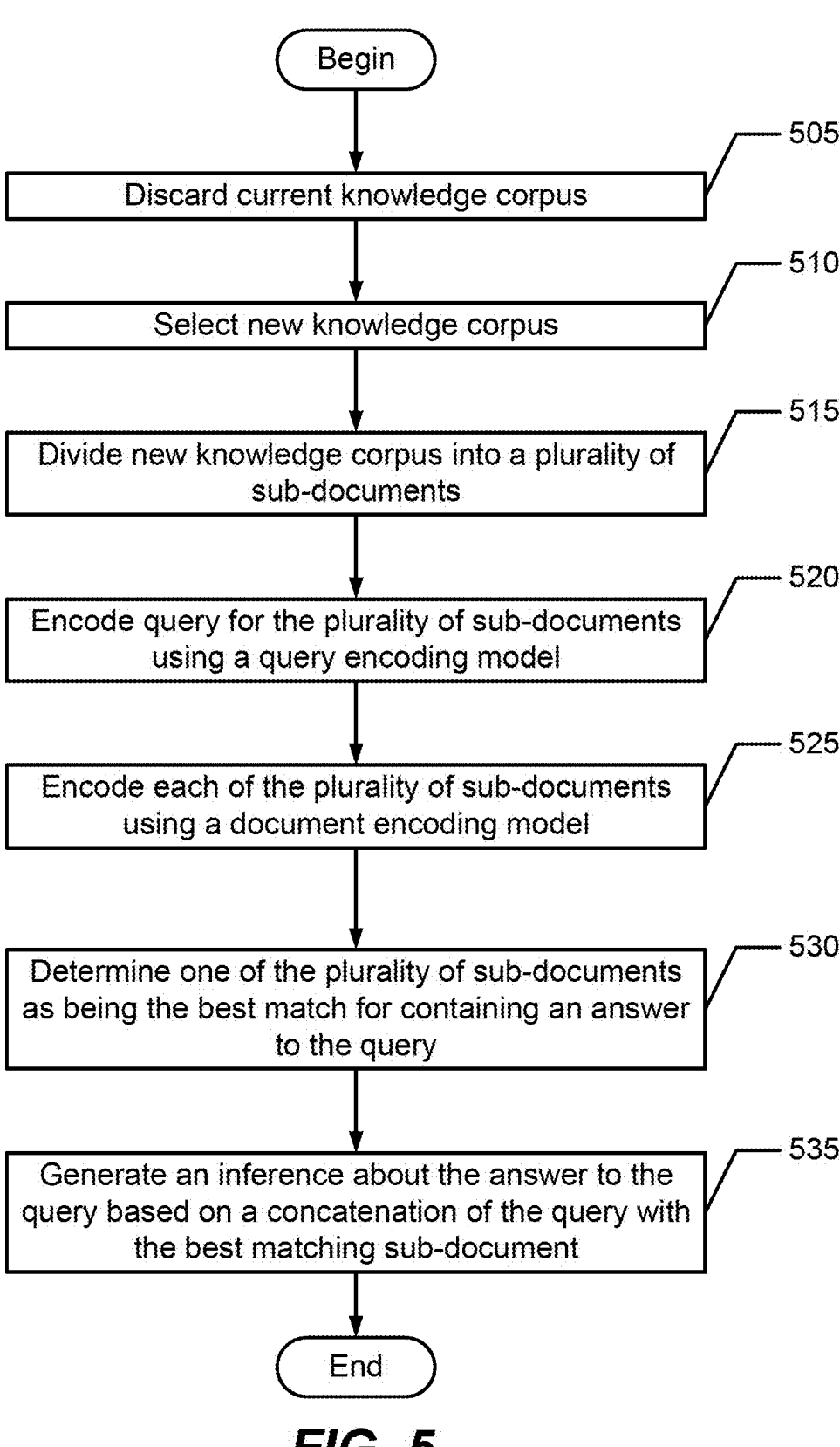

FIGS. 3-5 are flowcharts that illustrate training operations and inference operations of the QA system in accordance with some embodiments of the inventive concept. Referring now to FIG. 3, operations for training a QA system, in accordance with some embodiments of the inventive concept, begin with operations of the retriever engine 205. A current knowledge corpus is discarded at block 305 and a new knowledge corpus is selected at block 310. The new knowledge corpus is divided into a plurality of sub-documents at block 315 and may be indexed using a suitable categorization criterion. A query or question for the plurality of sub-documents is encoded using a query encoding model at block 320 and each of the plurality of sub-documents is encoded using a document encoding model at block 325. Based on these encodings, one or more sub-documents that match the subject matter of the query or question are determined or identified at block 330. These matching sub-documents are each concatenated with the query and communicated to the reader engine 230. Operations of the reader engine 230 continue at block 335 where an inference is generated about the answer to the query based on the matching sub-documents concatenated with the query. Each matching sub-document has an associated reader loss function result for the inference. The matching sub-document having the lowest reader loss function result is identified at block 340) and the identified matching sub-document is associated with a truth label for the query at block 345.

During training, various components of the QA system may be updated based on loss function results. For example, referring to FIG. 4, the AI reader engine 230 may be updated at block 400 based on the loss function results for the one or more matching sub-documents. Similarly, the query encoding model may be updated based on the match loss function results for the one or more matching sub-documents at block 405 and the document encoding model may be updated based on the match loss function results for the one or more matching sub-documents at block 410.

Referring now to FIG. 5, inference mode operations for a QA system, in accordance with some embodiments of the inventive concept, begin with operations of the retriever engine 205. A current knowledge corpus is discarded at block 505 and a new knowledge corpus is selected at block 510. The new knowledge corpus is divided into a plurality of sub-documents at block 515 and may be indexed using a suitable categorization criterion. A query or question for the plurality of sub-documents is encoded using a query encoding model at block 520 and each of the plurality of sub-documents is encoded using a document encoding model at block 525. One of the plurality of sub-documents is determined or identified as being the best match for containing an answer to the query or question at block 530. This best matching sub-document is concatenated with the query and communicated to the reader engine 230. Operations of the reader engine 230 continue at block 535 where an inference is generated about the answer to the query based on the best matching sub-document concatenated with the query.

Figure 6:
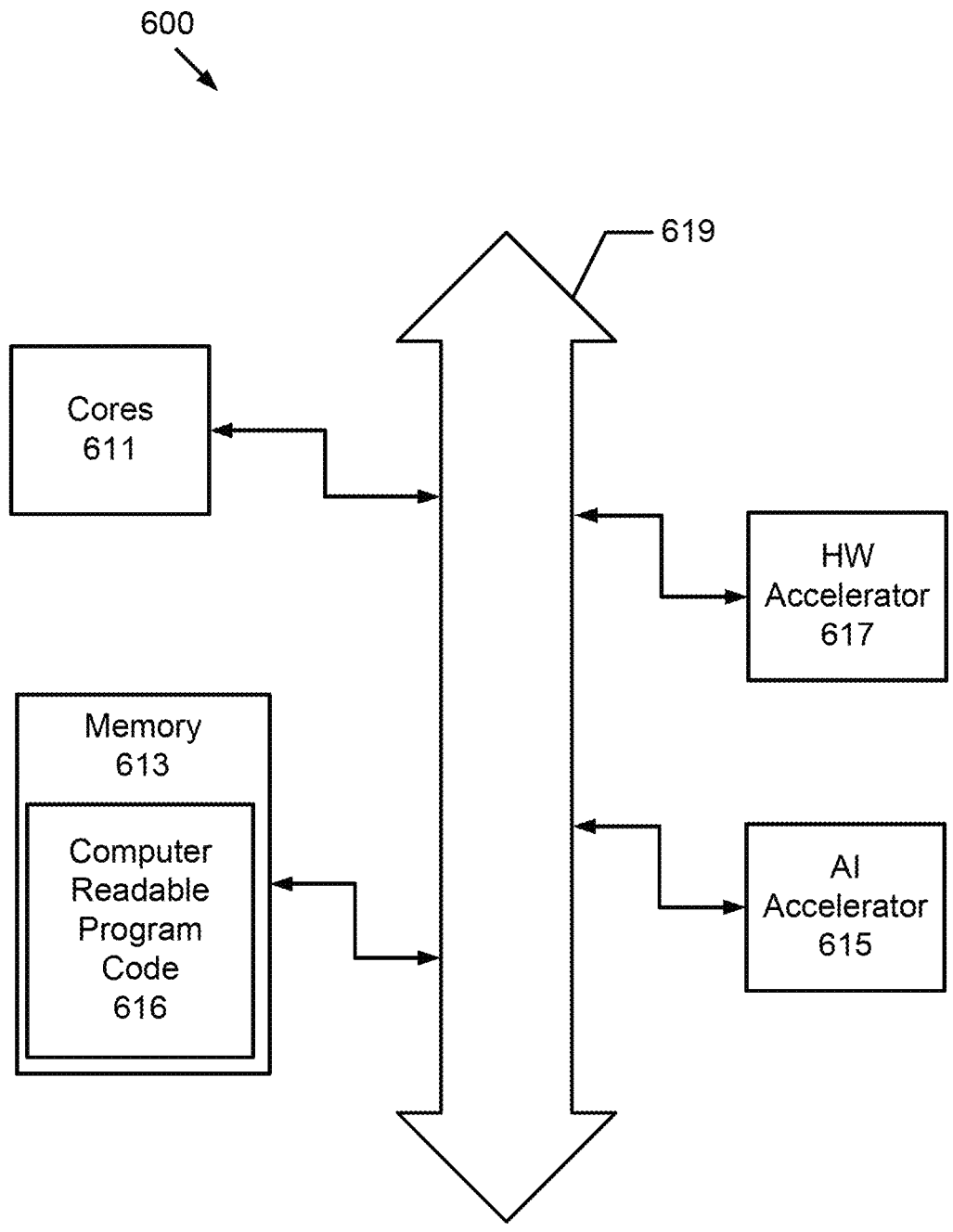
FIG. 6 is a data processing system that may be used to implement a QA system configured to provide document level inference in accordance with some embodiments of the inventive concept.

FIG. 6 is a block diagram of a data processing system 600 that may be used to implement the QA system server 140 of FIG. 1, the retriever engine 205, and/or reader engine 230 of FIG. 2 in accordance with some embodiments of the inventive concept. As shown in FIG. 6, the data processing system 600 may include at least one core 611, a memory 613, an Artificial Intelligence (AI) accelerator 615, and a hardware (HW) accelerator 617. The at least one core 611, the memory 613, the AI accelerator 615, and the HW accelerator 617 may communicate with each other through a bus 619.

The at least one core 611 may be configured to execute computer program instructions. For example, the at least one core 611 may execute an operating system and/or applications represented by the computer readable program code 616 stored in the memory 613. In some embodiments, the at least one core 611 may be configured to instruct the AI accelerator 615 and/or the HW accelerator 617 to perform operations by executing the instructions and obtain results of the operations from the AI accelerator 615 and/or the HW accelerator 617. In some embodiments, the at least one core 611 may be an ASIP customized for specific purposes and support a dedicated instruction set.

The memory 613 may have an arbitrary structure configured to store data. For example, the memory 613 may include a volatile memory device, such as dynamic random-access memory (DRAM) and static RAM (SRAM), or include a non-volatile memory device, such as flash memory and resistive RAM (RRAM). The at least one core 611, the AI accelerator 615, and the HW accelerator 617 may store data in the memory 613 or read data from the memory 613 through the bus 619.

The AI accelerator 615 may refer to hardware designed for AI applications. In some embodiments, the AI accelerator 615 may include a QA system including a natural language processing functionality configured to provide document level inference. The AI accelerator 615 may generate output data by processing input data provided from the at least one core 615 and/or the HW accelerator 617 and provide the output data to the at least one core 611 and/or the HW accelerator 617. In some embodiments, the AI accelerator 615 may be programmable and be programmed by the at least one core 611 and/or the HW accelerator 617. The HW accelerator 617 may include hardware designed to perform specific operations at high speed. The HW accelerator 617 may be programmable and be programmed by the at least one core 611.

Figure 7:
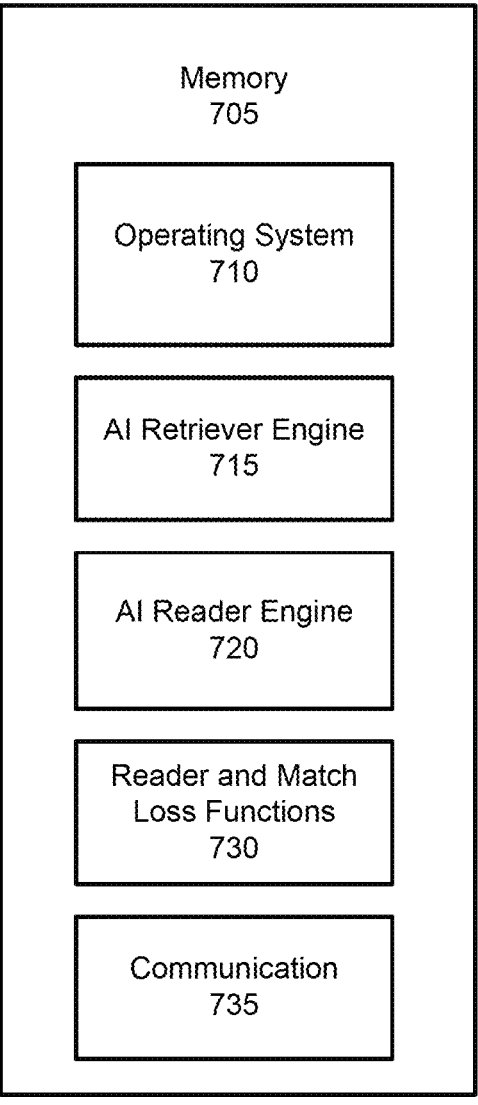
FIG. 7 is a block diagram that illustrates a software/ hardware architecture for use in a QA system configured to provide document level inference in accordance with some embodiments of the inventive concept.

FIG. 7 illustrates a memory 705 that may be used in embodiments of data processing systems, such as the QA system server 140 of FIG. 1, the retriever engine 205 and reader engine 230 of FIG. 2, and the data processing system 600 of FIG. 6, respectively, to facilitate operation of a QA system that provides document level inference. The memory 705 is representative of the one or more memory devices containing the software and data used for facilitating operations of the QA system server 140 and the QA engine module 145 as described herein. The memory 705 may include, but is not limited to, the following types of devices: cache, ROM, PROM, EPROM, EEPROM, flash, SRAM, and DRAM. As shown in FIG. 7, the memory 705 may contain five or more categories of software and/or data: an operating system 710, an AI retriever engine module 715, an AI reader engine module 720, a reader and match loss function module 730, and a communication module 735. In particular, the operating system 710 may manage the data processing system's software and/or hardware resources and may coordinate execution of programs by the processor.

The AI retriever engine module 715 may be configured to perform one or more of the operations described above with respect to the retriever engine 205 of FIG. 2. The AI reader engine module 720 may be configured to perform one or more of the operations described above with respect to the reader engine module 230. The reader and match loss functions module 730 may be configured to provide the loss function logic described above with respect to FIGS. 2-5. The communication module 735 may be configured to facilitate communication between the QA server 140 of FIG. 1 and/or the retriever engine 205 and reader engine 230 of FIG. 2 and entities, such as providers, insurance claim payors, clinical researchers, and other entities that may be sources of information for a knowledge base or corpus used to answer queries or questions and/or may be the sources of the queries or questions.

Although FIGS. 6 and 7 illustrate hardware/software architectures that may be used in data processing systems, such as the QA system 140 of FIG. 1, the retriever engine 205, the reader engine 230, and the data processing system 600 of FIG. 6, respectively, in accordance with some embodiments of the inventive concept, it will be understood that the present invention is not limited to such a configuration but is intended to encompass any configuration capable of carrying out operations described herein.

Computer program code for carrying out operations of data processing systems discussed above with respect to FIGS. 1-7 may be written in a high-level programming language, such as Python®, Java®, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the health care facility interface server 130 of FIG. 1, the QA system server 140 of FIG. 1, the retriever engine 205 and reader engine 230 of FIG. 2, and the data processing system 600 of FIG. 6 may each be implemented as a single processor system, a multi-processor system, a multi-core processor system, or even a network of stand-alone computer systems, in accordance with various embodiments of the inventive concept. Each of these processor/computer systems may be referred to as a "processor" or "data processing system." The functionality provided by the health care facility interface server 130 and the QA system server 140 may be merged into a single server or maintained as separate servers in accordance with different embodiments of the inventive concept.

The data processing apparatus described herein with respect to FIGS. 1-8 may be used to facilitate operation of a QA system that provides document level inference according to some embodiments of the inventive concept described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 705 when coupled to a processor includes computer readable program code that, when executed by the processor, causes the processor to perform operations including one or more of the operations described herein with respect to FIGS. 1-5.

Some embodiments of the inventive concept may provide a QA system that can be used by entities, providers, insurance claim payors, clinical researchers, and other entities to submit queries and receive answers thereto despite the generally large size of the knowledge base or corpus comprising a typical medical record document (i.e., medical record documents are often generated in batch form with many patient records concatenated together) and the need to keep certain medical information segregated to comply, for example, with privacy rules (e.g., PHI rules for handling patient records). By contrast, conventional QA systems that use a large knowledge base or corpus, such as a medical record document, may relabel the document at the token level. Such an approach involves use of the time of expert labelers to review a document and highlight spans that refer to that label within the document. This can be time consuming and expensive as typically every page is reviewed by a subject matter expert and every page is reviewed for each positive label. Furthermore, while such labeling may assist in processing a large knowledge base or corpus for matches with queries, the problem of reducing the risk of mixing PHI between patients remains. Embodiments of the inventive concept may provide a mechanism to use document level labels associated with medical charts, for example, to train a language model without needing to perform any additional relabeling.

Further Definitions and Embodiments

In the above-description of various embodiments of the present inventive concept, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising." when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented entirely hardware, entirely software (including firmware, resident software, micro-code, etc.) or combining software and hardware implementation that may all generally be referred to herein as a "circuit," "module," "component." or "system." Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

The description of the present inventive concept has been presented for purposes of illustration and description, but is not intended to be exhaustive or limited to the inventive concept in the form disclosed. Many modifications and variations will be apparent to those of ordinary skill in the art without departing from the scope and spirit of the inventive concept. The aspects of the inventive concept herein were chosen and described to best explain the principles of the inventive concept and the practical application, and to enable others of ordinary skill in the art to understand the inventive concept with various modifications as are suited to the particular use contemplated.

What is claimed is:

1. A method, comprising:

discarding, by one or more processors, a current knowledge corpus associated with a previous patient record to reduce the risk of mixing private information between patient records;

selecting, by the one or more processors, a new knowledge corpus associated with a new patient record which does not include the current knowledge corpus associated with the previous patient record;

dividing, by the one or more processors using an Artificial Intelligence (AI) retriever engine, the new knowledge corpus into a plurality of sub-documents;

encoding, by the one or more processors using the AI retriever engine, a query for the plurality of sub-documents using a query encoding model that generates a first vector representing the query;

encoding, by the one or more processors using the AI retriever engine, each of the plurality of sub-documents using a document encoding model that for each of the plurality of sub-documents, generates a second vector representing the sub-document; and determining, by the one or more processors using the AI retriever engine, two or more matching sub-documents of the plurality of sub-documents that are a match for containing an answer to the query based on the encoded query and each of the plurality of encoded sub-documents by comparing the first vector to each second vector to identify the two or more matching sub-documents;

generating, by the one or more processors using an AI reader engine, an inference about the answer to the query based on a concatenation of each of the two or more matching sub-documents with the query, each of the two or more matching sub-documents having an associated reader loss function result for the inference;

identifying, by the one or more processors using the AI reader engine, one of the two or more matching sub-documents having a lowest reader loss function result; and associating, by the one or more processors using the AI reader engine, the identified one of the two or more matching sub-documents with a truth label for the query.

2. The method of claim 1, further comprising:

updating, by the one or more processors, the AI reader engine based on the reader loss function results associated with the two or more matching sub-documents, respectively;

updating, by the one or more processors, the query encoding model based on at least one match loss function result between the query and the two or more matching sub-documents, respectively; and updating, by the one or more processors, the document encoding model based on the at least one match loss function result between the query and the two or more matching sub-documents, respectively.

3. The method of claim 1, wherein each of the query encoding model and the document encoding model comprise a vector space model.

4. The method of claim 3, wherein the vector space model uses a term frequency-inverse document frequency weighting scheme.

5. The method of claim 1, wherein each of the query encoding model and the document encoding model comprise a neural information retrieval model.

6. The method of claim 1, wherein the reader engine comprises a Long Short-Term Memory (LSTM) artificial recurrent neural network.

7. The method of claim 1, wherein the reader engine comprises a Bidirectional Encoder Representations from Transformers (BERT) machine learning system.

8. The method of claim 1, wherein the query comprises a question about one or more medical records.

9. A method, comprising:

discarding, by one or more processors, a current knowledge corpus associated with a previous patient record to reduce the risk of mixing private information between patient records;

selecting, by the one or more processors, a new knowledge corpus associated with a new patient record which does not include the current knowledge corpus associated with the previous patient record;

dividing, by the one or more processors using an Artificial Intelligence (AI) retriever engine, the new knowledge corpus into a plurality of sub-documents;

encoding, by the one or more processors using the AI retriever engine, a query for the plurality of sub-documents using a query encoding model that generates a first vector representing the query;

encoding, by the one or more processors using the AI retriever engine, each of the plurality of sub-documents using a document encoding model that for each of the plurality of sub-documents, generates a second vector representing the sub-document; and determining, by the one or more processors using the AI retriever engine, two or more matching sub-documents of the plurality of sub-documents that are a match for containing an answer to the query based on the encoded query and each of the plurality of encoded sub-documents by comparing the first vector to each second vector to identify the two or more matching sub-documents;

generating, by the one or more processors using an AI reader engine, an inference about the answer to the query based on a concatenation of the two or more matching sub-documents with the query.

10. The method of claim 9, further comprising:

providing, by the one or more processors, a supplemental knowledge corpus.

11. The method of claim 10, further comprising:

querying, by the one or more processors, the supplemental knowledge corpus to generate a preliminary query result; and modifying, by the one or more processors, the query for the plurality of sub-documents based on the preliminary query result.

12. The method of claim 11, wherein modifying the query for the plurality of sub-documents comprises concatenating the query with the preliminary query result.

13. The method of claim 9, wherein each of the query encoding model and the document encoding model comprise a vector space model; or wherein each of the query encoding model and the document encoding model comprise a neural information retrieval model.

14. The method of claim 9, wherein the reader engine comprises a Long Short-Term Memory (LSTM) artificial recurrent neural network.

15. The method of claim 9, wherein the reader engine comprises a Bidirectional Encoder Representations from Transformers (BERT) machine learning system.

16. The method of claim 9, wherein the query comprises a question about one or more medical records.

17. A system, comprising:

one or more processors; and one or more memories storing processor-executable instructions that, when executed by the one or more processors, cause the one or more processors to perform operations comprising:

discarding a current knowledge corpus associated with a previous patient record to reduce the risk of mixing private information between patient records;

selecting a new knowledge corpus associated with a new patient record which does not include the current knowledge corpus associated with the previous patient record;

dividing, using an Artificial Intelligence (AI) retriever engine, the new knowledge corpus into a plurality of sub-documents;

encoding, using the AI retriever engine, a query for the plurality of sub-documents using a query encoding model that generates a first vector representing the query;

encoding, using the AI retriever engine, each of the plurality of sub-documents using a document encoding model that for each of the plurality of sub-documents, generates a second vector representing the sub-document; and determining, using the AI retriever engine, two or more matching sub-documents of the plurality of sub-documents that are a match for containing an answer to the query based on the encoded query and each of the plurality of encoded sub-documents by comparing the first vector to each second vector to identify the two or more matching sub-documents;

generating, using an AI reader engine, an inference about the answer to the query based on a concatenation of each of the two or more matching sub-documents with the query, each of the two or more matching sub-documents having an associated reader loss function result for the inference;

identifying, using the AI reader engine, one of the two or more matching sub-documents having a lowest reader loss function result; and associating, using the AI reader engine, the identified one of the two or more matching sub-documents with a truth label for the query.

18. The system of claim 17, wherein the one or more processors further perform operations comprising:

updating the AI reader engine based on the reader loss function results associated with the two or more matching sub-documents, respectively;

updating the query encoding model based on at least one match loss function result between the query and the two or more matching sub-documents, respectively; and updating the document encoding model based on the at least one match loss function result between the query and the two or more matching sub-documents, respectively.

19. One or more non-transitory computer-readable media storing processor-executable instructions that, when executed by one or more processors, cause the one or more processors to perform operations comprising:

discarding a current knowledge corpus associated with a previous patient record to reduce the risk of mixing private information between patient records;

selecting a new knowledge corpus associated with a new patient record which does not include the current knowledge corpus associated with the previous patient record;

dividing, using an Artificial Intelligence (AI) retriever engine, the new knowledge corpus into a plurality of sub-documents;

encoding, using the AI retriever engine, a query for the plurality of sub-documents using a query encoding model that generates a first vector representing the query;

encoding, using the AI retriever engine, each of the plurality of sub-documents using a document encoding mode that for each of the plurality of sub-documents, generates a second vector representing the sub-document; and determining, using the AI retriever engine, two or more matching sub-documents of the plurality of sub-documents that are a match for containing an answer to the query based on the encoded query and each of the plurality of encoded sub-documents by comparing the first vector to each second vector to identify the two or more matching sub-documents;

generating, using an AI reader engine, an inference about the answer to the query based on a concatenation of each of the two or more matching sub-documents with the query, each of the two or more matching sub-documents having an associated reader loss function result for the inference;

identifying, using the AI reader engine, one of the two or more matching sub-documents having a lowest reader loss function result; and associating, using the AI reader engine, the identified one of the two or more matching sub-documents with a truth label for the query.

20. The one or more non-transitory computer-readable media of claim 19, wherein the one or more processors further perform operations comprising:

updating the AI reader engine based on the reader loss function results associated with the two or more matching sub-documents, respectively;

updating the query encoding model based on at least one match loss function result between the query and the two or more matching sub-documents, respectively; and updating the document encoding model based on the at least one match loss function result between the query and the two or more matching sub-documents, respectively.

* * * * *